United States Patent [19]

Alexander

[11] 4,127,548
[45] Nov. 28, 1978

[54] CEMENT COMPOSITIONS
[75] Inventor: John H. Alexander, Manchester, England
[73] Assignee: Imperial Chemical Industries Limited, London, England
[21] Appl. No.: 704,945
[22] Filed: Jul. 13, 1976

Related U.S. Application Data
[63] Continuation-in-part of Ser. No. 123,419, Mar. 11, 1971, abandoned.

[30] Foreign Application Priority Data
Mar. 18, 1970 [GB] United Kingdom ............... 13040/70

[51] Int. Cl.$^2$ ............................................. C08K 3/22
[52] U.S. Cl. ..................... 260/29.2 TN; 260/29.6 S
[58] Field of Search ........... 260/18 TN, 19 R, 22 TN, 260/29.2 TN, 29.3, 24, 25, 26, 2.5 AK; 106/90, 96

[56] References Cited
U.S. PATENT DOCUMENTS

| | | | |
|---|---|---|---|
| 3,211,675 | 10/1965 | Johnson | 260/2.5 |
| 3,441,523 | 4/1969 | Dwyer | 260/2.5 AK |
| 3,640,920 | 2/1972 | Cear | 260/2.5 AK |
| 3,772,051 | 11/1973 | Shearing | 260/29.2 TN |
| 3,778,290 | 12/1973 | Shearing | 260/29.2 TN |

FOREIGN PATENT DOCUMENTS
1,192,864 5/1970 United Kingdom.

Primary Examiner—Paul R. Michl
Attorney, Agent, or Firm—Cushman, Darby & Cushman

[57] ABSTRACT

Non-foaming cement compositions comprising a hydraulic cement, a low density filler, water, an organic polyisocyanate and an isocyanate-reactive organic compound, the said composition, containing by weight, 10 to 10,000 parts of filler, 10 to 75 parts of water and 11 to 5,000 parts of an organic polyisocyanate and isocyanate-reactive organic compound taken together per 100 parts of hydraulic cement, the polyisocyanate being used in excess with respect to the isocyanate-reactive compound for reaction with the water and the total amount polyisocyanate and isocyanate-reactive organic compound being greater than the amount of water present. These compositions set rapidly and provide strong, durable flooring surfaces.

5 Claims, No Drawings

CEMENT COMPOSITIONS

This application is a continuation in part of our co-pending application Ser. No. 123,419 filed Mar. 11, 1971 now abandoned.

This invention relates to an improvement in or modification of the invention described in our U.K. patent specification No. 1,192,864.

U.K. patent specification No. 1,192,864 describes and claims compositions having as essential ingredients a hydraulic cement, a silica filler, water and an organic compound containing a plurality of isocyanate groups. The silica fillers which may be used in these compositions are, for example, sands and silicas of low clay content, preferably washed, and having a particle size mainly within the range 1½" – 200 B.S. sieve size (3.81 – 0.0076 cm) although sizes outside these limits may be used. The compositions so obtained have a high density and a moderate to very coarse texture, and are intended particularly for use as fast-setting flooring finishes. However, because of their high density, these compositions add very considerably to the weight of the upper floors of buildings in which they are used and consequently to the stresses which must be borne by the load-bearing members of the building.

We have now found that the silica fillers used in the compositions described in our U.K. patent specification No. 1,192,864 may be replaced wholly or in part by low density fillers to give cement compositions having a lower density without any substantial reduction in the durability of the composition after it has set. The compositions show superior compression and tensile strength/weight ratios over compositions containing an equivalent amount of silica filler.

Thus the present invention provides non-foaming cement compositions comprising
 (a) 100 parts by weight of a hydraulic cement;
 (b) 10 to 10,000 parts by weight of a low density filler selected from the group consisting of non-olefinic plastic materials, wood materials, asbestos, glass fibre and expanded clay;
 (c) 10 to 75 parts by weight of water; and
 (d) 11 to 5,000 parts by weight of an organic polyisocyanate and isocyanate-reactive organic compound taken together, the polyisocyanate being used in excess with respect to the isocyanate reactive compound for reaction with the water and the total amount of polyisocyanate and isocyanate-reactive organic compound being greater than the amount of water present.

By non-olefinic plastic materials we mean thermoplastic and thermosetting polymers and copolymers, foamed or unfoamed, in fibrous or chip form excluding olefinic plastics such as polyethylene and polypropylene. As examples of suitable plastics we would mention polystyrene foam, polyurethane foam, polyvinyl chloride and urea/formaldehyde polymers, and polyamide, polyester and polyacrylonitrile fibres. In particular we would mention nylon chips which are usefully of about ¼ inch dia. Suitable wood materials include wood chips and particularly saw dust.

The term "hydraulic cement" is used in its usual sense to denote the class of structural materials which are applied in admixture with water and thereafter harden or set as a result of physical or chemical changes which consume the water present. As well as Portland cement, it includes:

1. Rapid-hardening cements, as characterized by those with high alumina contents.
2. Low-heat cements as characterized by high percentages of dicalcium silicate and tetracalcium alumino ferrite and low percentages of tricalcium silicate and tricalcium aluminate.
3. Sulphate resisting cements as characterized by unusually high percentages of tricalcium silicate and dicalcium silicate and unusually low percentages of tricalcium aluminate and tetracalcium alumino ferrite.
4. Portland blast-furnace cement as characterised by a mixture of Portland cement clinker and granulated slag.
5. Masonry cements as characterised by mixtures of Portland cement and one or more of the following; hydrated lime, granulated slag, pulverised limestone, colloidal clay, diatomaceous earth or other finely divided forms of silica, calcium stearate and paraffin.
6. Natural cements as characterised by material obtained from deposits in the Lehigh Valley, U.S.A.
7. Lime cements as characterised by oxide of calcium in its pure or impure forms and whether containing or not some argillaceous material.
8. Selenitic cement as characterised by the addition of 5–10% of plaster of Paris to lime.
9. Pozzolanic cement as characterised by the mixture of pozzolana, trass kieselguhr, pumice, tufa, santorin earth or granulated slag with lime mortar.
10. Calcium sulphate cements as characterised by those depending on the hydration of calcium sulphate and includes plaster of Paris, Keene's cement and Parian cement.

As organic polyisocyanates which may be used there may be mentioned tolylene diisocyanate and diphenylmethane diisocyanate, also uretedione or isocyanurate polymers of these, and isocyanate-ended polyurethanes obtained by reacting an excess of an organic diisocyanate with a polyfunctional isocyanate-reactive compound such as a glycol or higher polyhydric alcohol, amino alcohol or polyamine, a polyester, polyesteramide or polyether. There may also be used the diphenylmethane diisocyanate-containing composition known as "crude MDI", which is obtained by phosgenating the crude diamino diphenylmethane which is prepared by condensing formaldehyde and aniline in the presence of hydrochloric acid.

Although the polyisocyanate may be used in the absence of any other isocyanate-reactive compound except the water which is an essential ingredient of the compositions of the invention, it is preferred to add also an isocyanate-reactive organic compound to the compositions, as shrinkage on setting of the compositions is thereby reduced. As examples of the isocyanate-reactive organic compounds which may be used there may be mentioned polyhydric alcohols, aminoalcohols, polyamines, polyesters, polyesteramides and drying oil and non drying oil modified alkyd resins, but it is preferred to use a dihydric polyether having an equivalent weight of from 100 to 1500 or the products obtained by high temperature reaction between castor oil and hard resins, defined as products which are obtained by heating castor oil with a resin which is a rosinate of a metal selected from Group IIa of the Periodic Table or a condensation product of rosin with
 (i) at least one polyhydric alcohol or (ii) at least one polyhydric alcohol and at least one optionally substituted phenol/formaldehyde resol resin, or (iii) at least one polyhydric alcohol and at least one α,β-unsaturated dicarboxylic acid or the anhydride thereof. As examples of rosinates of metals selected from Group IIa of the Periodic Table which may be reacted with castor oil there may be mentioned calcium rosinate, and barium rosinate.

As examples of polyhydric alcohols which may be condensed with rosin, either alone or together with an optionally substituted phenol/formaldehyde resol resin or an δ,β-unsaturated dicarboxylic acid or the anhydride thereof, there may be mentioned glycerol, pentaerythritol, trimethylolpropane and sorbitol.

By resol resins we mean the alkaline catalysed reaction products of one mole of a phenol with at least one mole of formaldehyde. The most commonly used and preferred phenol for use in the preparation of resol resins is phenol itself, but other phenols and alkyl substituted phenols, for example, p-butylphenol, p-octylphenol and p-alkyl substituted phenols generally may also be used.

As examples of α,β-unsaturated dicarboxylic acids and anhydrides thereof which may be condensed with rosin together with a polyhydric alcohol as defined above there may be mentioned maleic aicd, fumaric acid and maleic anhydride.

The reaction of the castor oil with the resin as defined above is carried out at a high temperature for example, at 235°-240° C. for a time of from ½ to 2 hours.

The castor oil and resin may be used in the proportions of from 99:1 to 1:99 parts by weight, the preferred range being from 95:5 to 20:80 parts by weight.

Any of the compositions of the present invention may also include a coloured pigment when decorative finishes are required. Inert solvents and thinners may also be added.

The proportions of the different ingredients used in the present compositions may be varied widely. Thus per 100 parts by weight of cement there may be used from 10 to 10,000 parts by weight of filler, from 10 to 75 parts by weight of water, from 11 to 5,000 parts by weight of resin-forming components, defined as organic polyisocyanate polyisocyanate plus isocyanate-reactive organic compound, and from 0 to 200 parts by weight of solvents. Preferred quantities are from 50 to 8000 parts of filler, 20–50 parts of water, 21 to 4000 parts of urethane resin and 0–100 parts of solvent.

It is however essential that the ratio of water to urethane resin-forming components is such that there is at least one part of the latter components present per part of water if products having an acceptable compression strength are to be obtained.

The compositions of the invention, according to their fluidity, may be used as self-levelling or trowelling flooring finishes and are superior to ordinary cement floorings or other resin-bonded cement flooring compositions by virtue of their rate of setting. The compositions make it possible to obtain floors which are sufficiently stable to walk upon within 1–2 hours of laying and to withstand the falling weight impact test of DEF 1083, method 17 after only 24 hours curing.

The invention is illustrated but not limited by the following Examples in which parts and percentages are by weight:

EXAMPLE 1

100 Parts of Portland cement and 100 parts of a 70% solution of a polyisocyanate (obtained as described below) are mixed together, and 8 parts of rigid polyurethane foam of approximately ¼ inch (6.35 mm) diameter, 25 parts of water and 15 parts of an oxypropylated glycerol of hydroxyl value 535 mg. KOH/g. are then mixed in.

A quick setting fluid composition is obtained which when spread out in a layer ½ inch (12.7 mm) thick quickly solidifies and is firm enough to walk on in about 2 hours.

The polyisocyanate solution which is used in this Example is obtained by heating a mixture of tolylene diisocyanate (1 mole), trimethylolpropane (0.197 mole) and butylene glycol (0.159 mole) for 2 hours at 60° C in the presence of half their combined weight of a 1:1 mixture of β-ethoxyethyl acetate and xylene. 0.029 mole of an oxypropylated glycerol of molecular weight 3000 is added and heating is continued for 4 hours at 60° C. Sufficient xylene is then added to give a solution having a 70% solids content.

EXAMPLE 2

This is a two component composition. Component A is obtained by mixing together 100 parts of Portland cement, 50 parts of water and 25 parts of sawdust.

Component B is prepared by mixing 93 parts of a castor oil-hard resin reaction product (obtained as described below) with 21 parts of a pigment paste containing 66⅔% of red iron oxide as a dispersion in the same castor oil-hard resin reaction product and with 50 parts of a crude MDI composition containing approximately 50% of diphenylmethane diisocyanate, the remainder being methylene-linked polyphenyl polyisocyanates of higher functionality. When a homogeneous blend is obtained, Component B is immediately mixed into Component A to give a fast setting liquid composition which when spread out into a layer ½ inch (12.7 mm) thick produces a surface which is firm enough to walk on in about 1-1½ hours.

The castor oil-hard resin product used in this Example is prepared by heating 320 parts of 1st Pressings Castor Oil with 80 parts of an esterified rosin-modified phenol-formaldehyde resol resin at 240° C for 45 minutes. The latter ingredient is the glycerol ester of the product from the reaction between rosin and a diphenylolpropaneformaldehyde resol resin.

EXAMPLE 3

A composition is prepared by mixing together the following ingredients:

| | |
|---|---|
| A castor oil-hard resin product prepared as described in Example 2. | 33 parts |
| Octyl epoxystearate (plasticiser) | 17 parts |
| Water | 25 parts |
| Portland cement | 100 parts |
| Saw dust | 40 parts |
| A crude MDI composition as described in Example 2. | 50 parts |

Immediately after mixing the composition is cast into (i) a cubic mould (the area of each face of the cube being 50 cm$^2$) and (ii) a standard dumb-bell test piece having a thickness of 1 inch and a cross-sectional area at the 'waist' portion of 1 sq.inch. After setting, the test pieces were removed from their moulds and allowed to cure for 1 week before testing. The following test results are obtained:

| Compression strength (C.S.) | 2200 lb/in² |
| Tensile strength (T.S) | 1050 lb/in² |
| Density (D) | 90 lb/ft³ |
| Strength weight ratio | |
| Compression (C.S/D) | 30 |
| Tensile (T.S/D) | 11.7 |

EXAMPLE 4

A composition is prepared and tested as described in Example 3 except that the 40 parts of saw dust are replaced by 150 parts of ¼ inch nylon 66 chips.

| The following test results are obtained: | |
| Compression strength (C.S) | 3180 lb/in² |
| Tensile strength (T.S) | 1220 lb/in² |
| Density (D) | 85 lb/ft³ |
| Strength weight ratio | |
| Compression (C.S/D) | 37.5 |
| Tensile (T.S/D) | 14.5 |

EXAMPLE 5

A composition is prepared by mixing together the following ingredients:

| A castor oil-hard resin product prepared as described in Example 2 | 2500 parts |
| Water | 75 parts |
| Portland cement | 100 parts |
| Nylon 66 chips (¼ inch diameter) | 10,000 parts |
| A crude MDI composition as described in Example 2 | 2500 parts |

Immediately after mixing the composition is spread out into a layer ½ to ⅝ inch thick which gives a surface hard enough to walk on in 6–7 hours and which has a compression strength of approximately 1200 lb/in² after 3 days cure.

We claim:

1. A cement composition comprising:
   (a) 100 parts by weight of a hydraulic cement;
   (b) 10 to 10,000 parts by weight of a low density filler selected from the group consisting of urea/formaldehyde polymers, polyamide and polyester and wood cellulose;
   (c) 10 to 75 parts by weight of water; and
   (d) up to 5,000 parts by weight of an organic polyisocyanate and isocyanate-reactive organic compound taken together, the polyisocyanate being used in excess with respect to the isocyanate reactive compound for reaction with the water and the total amount of polyisocyanate and isocyanate-reactive organic compound being greater than the amount of water present.

2. A composition as claimed in claim 1 wherein the filler is selected from the group consisting of saw dust and nylon 66 chips.

3. A composition as claimed in claim 1 wherein the hydraulic cement is selected from Portland cement, rapid hardening cements. Portland blast-furnace cement, masonry cements, natural cements, lime cements, selenitic cement, Pozzolamic cement and calcium sulphate cements.

4. A composition as claimed in claim 1 wherein the isocyanate reactive compound is a dihydric or trihydric polyether having an equivalent weight of from 100 to 1500.

5. A flooring surface including the set composition comprising:
   (a) 100 parts by weight of a hydraulic cement;
   (b) 10 to 10,000 parts by weight of low density filler selected from the group consisting of urea/formaldehyde polymers, polyamide, polyester and wood cellulose;
   (c) 10 to 75 parts by weight of water; and
   (d) up to 5,000 parts by weight of an organic polyisocyanate and isocyanate-reactive organic compound taken together, the polyisocyanate being used in excess with respect to the isocyanate reactive compound for reaction with the water and the total amount of polyisocyanate and isocyanate-reactive organic compound being greater than the amount of water present.

* * * * *